(12) United States Patent
Scura et al.

(10) Patent No.: US 6,549,376 B1
(45) Date of Patent: Apr. 15, 2003

(54) GIMBAL SUSPENSION WITH VIBRATION DAMPER

(76) Inventors: John E. Scura, 3160 Indian Mesa Dr., Thousand Oaks, CA (US) 91360; Frank Obregon, 765 Watson Canyon, #136, San Ramon, CA (US) 94583; Lam Tran, 486 Madera, San Jose, CA (US) 95112

( * ) Notice: Subject to any disclaimer, the term of this patent is extended or adjusted under 35 U.S.C. 154(b) by 0 days.

(21) Appl. No.: 09/540,246

(22) Filed: Mar. 31, 2000

(51) Int. Cl.[7] .............................................. G11B 21/20
(52) U.S. Cl. .............................. 360/245.3; 360/245.1
(58) Field of Search .......................... 360/245, 245.1, 360/245.3

(56) References Cited

U.S. PATENT DOCUMENTS

| | | | |
|---|---|---|---|
| 4,389,688 A | | 6/1983 | Higashiyama |
| 4,853,811 A | * | 8/1989 | Brooks, Jr. et al. |
| 5,079,660 A | * | 1/1992 | Yumura et al. |
| 5,166,847 A | * | 11/1992 | Zak |
| 5,187,625 A | | 2/1993 | Blaesher et al. |
| 5,321,568 A | * | 6/1994 | Hatam-Tabrizi |
| 5,473,487 A | | 12/1995 | Nagase |
| 5,856,896 A | | 1/1999 | Berg et al. |

FOREIGN PATENT DOCUMENTS

| | | | |
|---|---|---|---|
| JP | 60-140579 | * | 7/1985 |
| JP | 62-028973 | * | 2/1987 |
| JP | 11-185416 | * | 7/1999 |

* cited by examiner

Primary Examiner—Craig A. Renner
(74) Attorney, Agent, or Firm—Gregory Smith & Associates; Jeffrey P. Aiello

(57) ABSTRACT

A head suspension assembly comprising a visco-elastic coupling between a load beam dimple or protrusion and a suspension flexure to which a slider is rigidly coupled. The damping material is selected for a low static modulus, which reduces mechanical vibration by absorbing kinetic energy and releasing the energy as heat. The gimbaling function of the suspension is not significantly effected by the damping material because the damping effect occurs primarily when there is an undesirable relative velocity (movement with respect to time) between the dimple and the flexure.

16 Claims, 2 Drawing Sheets

GIMBAL SUSPENSION WITH VIBRATION DAMPER

FIELD OF THE INVENTION

This invention relates generally to suspension mechanism for supporting a device, such as a magnetic head, capable of reading and or writing data to or from a data storage medium. More particularly, the invention relates to an improved gimbal suspension for reducing vibration experienced by a disk head slider.

DESCRIPTION OF THE PRIOR ART

Data storage devices employing one or more rotating disks with one or more surfaces on each disk useable for storing digital data are well known. Such data storage devices are often referred to as disk drives. Disk drives provide a relatively low cost means for randomly storing and accessing data. Typically, each data storage surface is divided into a number of concentric circular data tracks. Each data track is typically further divided into a number of data track locations or sectors capable of storing information. Generally, data is written or accessed by positioning a read/write magnetic head held by a head suspension for supporting the head over a selected data track while the disk is rotating. The read/write head can then read or write data to or from track sectors located on that data track. The read/write head is typically biased against the surface of the disk such that, as the disk rotates, the read/write head "flies" on an air bearing above the disk.

A typical suspension system in a hard disk drive includes a voice coil motor configured for rotating an actuator arm over a desired location on the disk by rotating the actuator arm around an axis on a support spindle. A head suspension or load beam is coupled to the end of the actuator arm, and frequently, a flexure that carries the read/write head is coupled to the end of the load beam. This type of suspension may be used in both magnetic and non-magnetic data storage devices.

As efforts to increase track density continue, the radial spacing between concentric data tracks on the disks decreases. As the track density increases, it is increasingly difficult for known motor servo systems to quickly and precisely position the read/write head over a desired data track. This problem is complicated by the increased susceptibility of such drives to sources of read/write errors. For example, errors can arise from mechanical vibration of the read/write head. Undesirable levels of vibration may cause read/write errors, and may also delay the transfer of data because the data cannot be confidently transferred until the amplitude of vibration has substantially decayed.

What is needed is an improved gimbal suspension mechanism for supporting a head capable of reading and or writing data to or from a data storage medium that reduces undesirable vibration of the head, thereby potentially reducing wear loss of the disk and head, and potentially decreasing seek times.

SUMMARY OF THE INVENTION

Accordingly, the current invention is a head suspension assembly comprising a vibration dampening coupling between a protrusion on a support, and a support plate to which a slider is preferably rigidly coupled. In a preferred embodiment, the slider support plate is coupled to and supported by a flexure configured to allow the slider support plate to gimbal within desired parameters. The flexure is configured and positioned so that the slider support plate coupled to the flexure tends to exert pressure against the protrusion on the support structure. The vibration damping coupling between the protrusion on the support structure and the slider support plate preferably comprises a vibration dampening material selected for a low static modulus, which reduces mechanical vibration by absorbing kinetic energy and releasing the energy as heat. The gimbaling function of the suspension is not significantly effected by the damping material because the damping effect tends to be significant primarily when there is an undesirable relative velocity or movement with respect to time between the protrusion on the support structure and the slider support plate. The support structure is preferably a load beam, or a structure coupled to a load beam. The load beam preferably has a top surface, and a bottom surface, and a distal end with the protrusion extending from a top surface or a bottom surface of the load beam. The protrusion on the top surface or on the bottom surface of the load beam is preferably defined by a corresponding depression on the opposite surface of the load beam. The vibration dampening material is preferably a visco-elastic material, more preferably formed into a sheet of any desired shape.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE INVENTION

The current invention is a gimbaled head suspension assembly comprising a visco-elastic vibration dampening material between a protrusion on a relatively rigid structure, such as a load beam, and a surface of a suspension flexure preferably coupled to the load beam. The flexure supports the head used to access data on a data storage medium. For example, a slider including a read/write head may be coupled to the flexure. The damping material is selected for a low static modulus, which reduces mechanical vibration by absorbing kinetic energy and releasing the energy as heat.

The gimbal suspension with Vibration Damper of the invention (hereafter "gimbal suspension 10") will preferably be used in association with known disk storage actuation systems such as those typically used in current magnetic data storage devices such as hard disk drives, and optical data storage devices such as CD drives. Although it is preferred to use the invention on disk shaped data storage mediums, the invention may also be used in other kinds of data storage devices. The invention will be discussed in more detail with reference to FIGS. 1 though 4, wherein like numbers refer to like elements.

Figure 1:
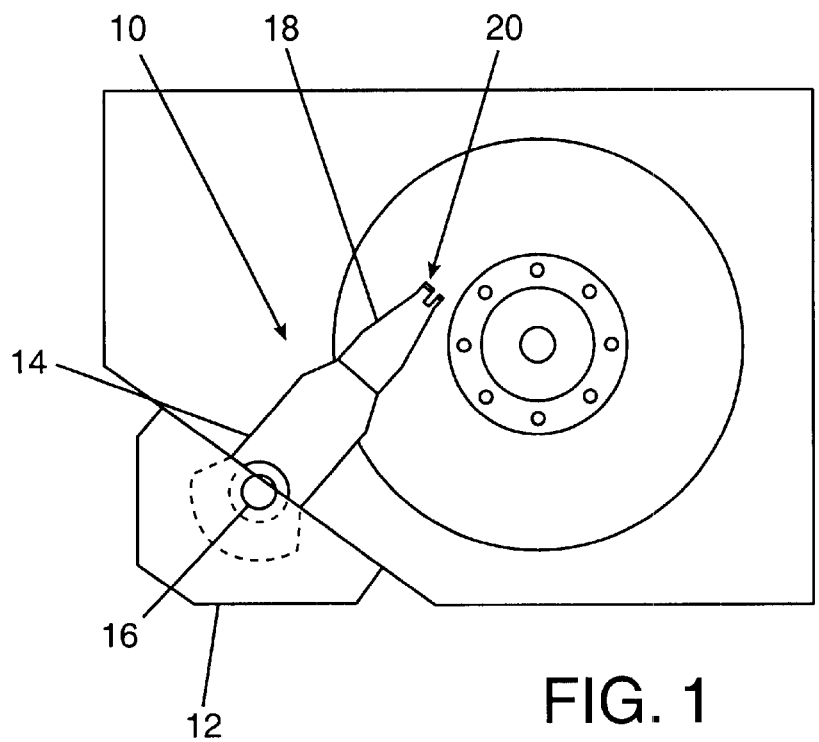
FIG. 1 shows a top plan view of a typical hard disk drive incorporating an embodiment of the gimbal suspension of the invention.

FIG. 1 shows a generic hard disk drive actuation system 12 including the gimbal suspension 10 of the invention. The generic actuation system 12 comprises a voice coil motor 14 configured to rotate an actuator arm 16 around an axis on a support spindle 18. A load beam 20 coupled to the end of the actuator arm 16, and a flexure 32 is coupled to the end of the actuator arm 16. The configuration of the generic disk drive actuation system 12 is not critical to the invention, and the gimbal suspension 10 of the invention may be used in many different known actuation system configurations.

Figure 2:
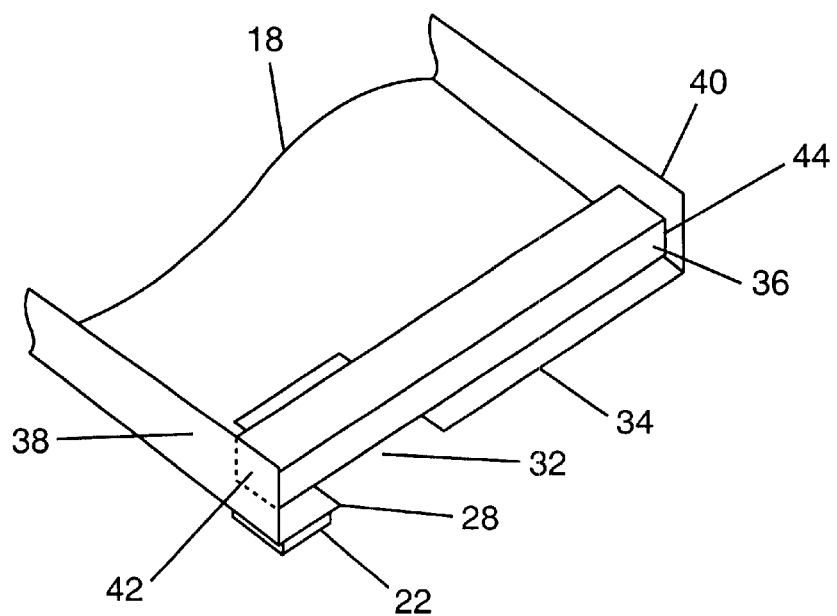
FIG. 2 shows an embodiment of the load beam and the gimbal suspension of the invention.

FIG. 2 shows a preferred embodiment of the gimbal suspension 10. The load beam 20 includes a proximal end 22 that is coupled to the end of the actuator arm 16, and a distal end 24 including a dimple or protrusion 26. The specific means of attaching the load beam 20 to the actuator arm 16 is not an essential feature of the invention, and any know attachment means may be used including the utilization of known swagging techniques, welds, bolts or screws, and adhesives. The load beam 20 is preferably formed from a flat sheet material such as a stainless steel sheet. The side edges of the load beam 20 may be bent upward to form walls 30 along the side edges of the load beam 20 in order to increase resistance to bending in a direction roughly perpendicular to the surface of the adjacent data disk 28 (seen in FIG. 1). The particular configuration of the load beam 20 is not critical to the invention, and in alternate embodiments the gimbal suspension 10 can be used with other practical load beam configurations.

Figure 3:
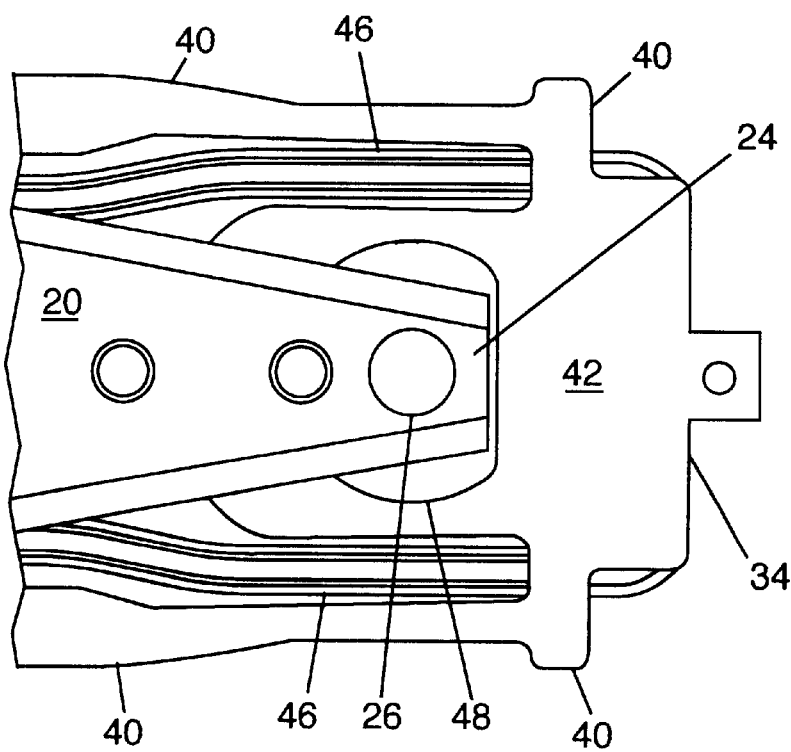
FIG. 3 shows a view of the distal end portion of the gimbal suspension.

FIG. 3 shows a top view of a portion of the gimbal suspension 10 of FIG. 2. The load beam 20 is tapered at its distal end 24, and the protrusion 26 is formed on the distal end 24 of the load beam 20 to properly load the distal portion 34 of the flexure 32 used to support a slider 38, so that it will facilitate the multiple axis gimbaling of the slider 38 when the gimbal suspension 10 is installed in a hard disk drive. The protrusion is preferably formed by creating a depression on the surface of the load beam 20 to form the protrusion 26 on the opposite side of the load beam. However, in alternate embodiments, the protrusion may be made by other known means. In further alternate embodiments, a separate rigid piece including the protrusion 26 may be coupled to the distal end 24 of the load beam 20.

Figure 4:
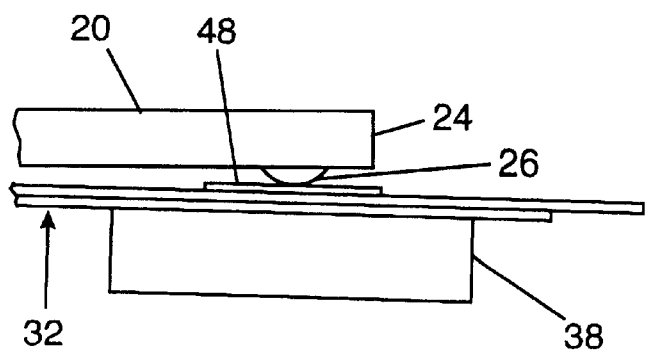
FIG. 4 shows a side view of the distal end portion of the gimbal suspension.
Figure 1:
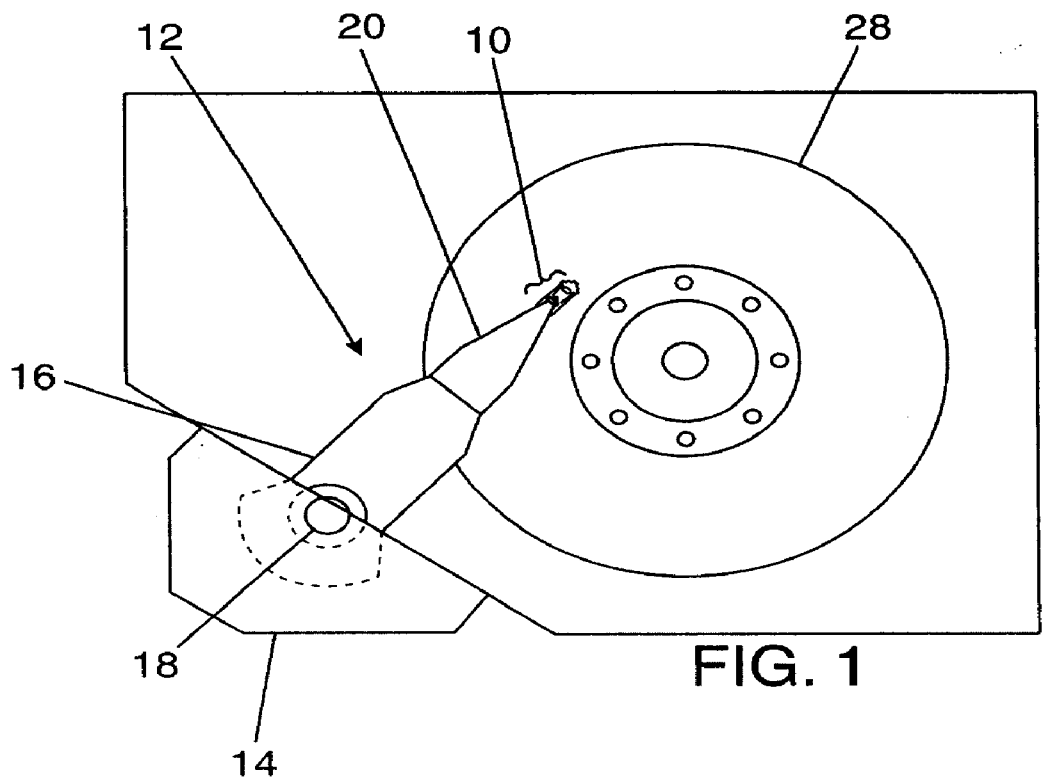
Figure 2:
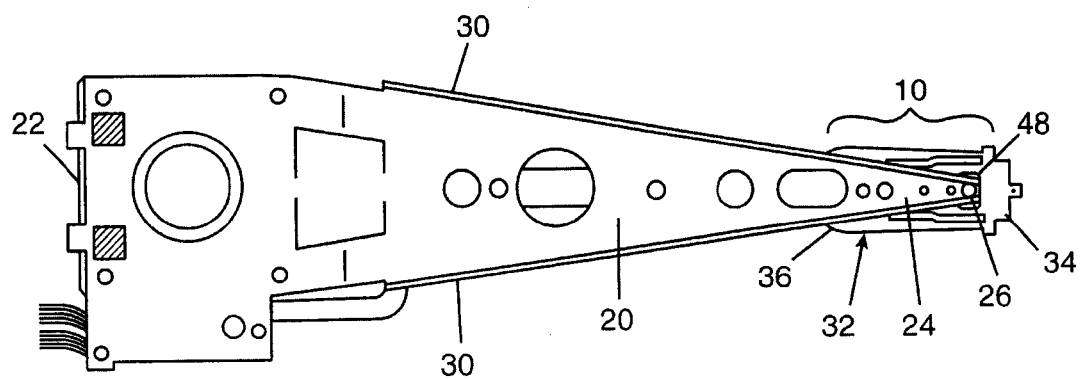
Figure 3:
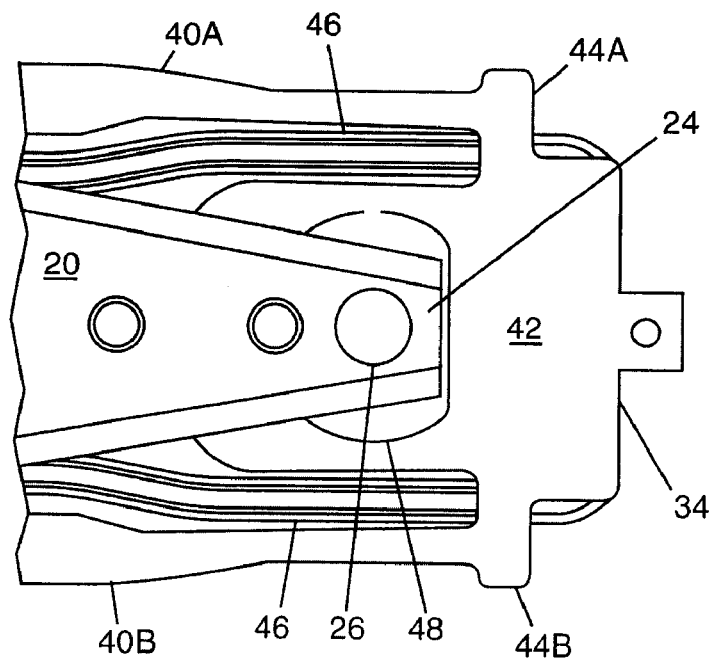

A proximal portion 36 of the flexure 32 is preferably coupled to a surface of the load beam 20 using one or more spot welds, but in other embodiments any desired means for coupling the proximal end 36 of the flexure 32 to the load beam 20 may be used, including adhesives. In any case, the flexure 32 is preferably coupled to the load beam 20 in a manner that results in a distal portion 34 of the flexure 32 being bent away from a plane defined by an adjacent surface of the load beam 20 by contact with the protrusion 26 at the distal end 24 of the load beam 20, as shown in FIG. 4, which is a side view of the gimbal suspension 10 of FIG. 3. Consequently, in the preferred embodiment, the distal portion 34 tends to exert a spring force against the protrusion 26 on the load beam 20.

Referring again to FIG. 3, the gimbal suspension 10 includes, a pair of support arms 40a and 40b coupled to a central slider mounting support plate, hereafter support plate 42. Any known means for coupling the slider 38 to the support plate 42 may be used, including the use of an adhesive such as a silver doped epoxy. The slider 38 is preferably coupled to the support plate 42 of the flexure 32 on the side of the support plate 42 opposite the side adjacent to the protrusion 26 on the load beam 20. The support plate 42 includes a pair of opposing protrusions 44a and 44b that are coupled to the distal ends of the support arms 40a and 40b. The features of the flexure 32 are preferably formed by stamping or etching the features from a flat sheet of material so that the support arms 40a and 40b and the slider support plate 42 are a unitary body, but in alternate embodiments, separate parts may be used. The configuration of the load beam 20, with protrusion 26, and the support plate 42 of the flexure 32 biased against the protrusion 26 allows the support plate 42, and attached slider 38, to gimbal within acceptable limits to conform to the surface of the disk 28.

In the preferred embodiment shown, a flexible cable assembly 46 is routed along the load beam 20 and on each side of the flexure 32 and couples to electrical conductors or bond pads (not shown) on the slider 38 to provide electrical communication with transducers on the slider 38. The slider 38 preferably includes at least one read/write element.

A visco-elastic material 48 is placed between the protrusion or dimple and the surface of the flexure 32. The visco-elastic material 48 selected is preferably a sheet of material with a high energy loss factor, is preferably cohesive in order to reduce particle generation, and preferably has no significant harmful outgassing. Any acceptable viscoelastic material 48 may be used, however, a preferred visco elastic material is a 3M product identified as ISD 140 PO1.

The sheet of visco-elastic material 48 may be formed in any desired shape, and the particular shape selected may be optimized to meet manufacturing or assembly and handling requirements. The sheet of visco-elastic material 48 is preferably between 0.01 and 0.0001 inches thick, and most preferably approximately 0.001 inches thick. The sheet of visco-elastic material 48 is preferably coupled to the flexure 32 by adhesion, meaning by means of its own surface tension, however, other resins or other known means for coupling the visco-elastic material 48 to the flexure 32 may be used.

As previously explained, the flexure 32 is preferably coupled to the load beam 20 in a manner that results in a distal portion 34 of the flexure 32 tending to exert a force against the protrusion 26 with the visco-elastic material 48 positioned between the protrusion 26 and the flexure 32. The spring force the flexure 32 exerts against the protrusion 26 preferably creates a well in the visco-elastic material 48. The well tends to increase the lateral stability of the gimbal suspension 10 and presents a larger surface area for the protrusion 26 to shear against the visco-elastic material 48. Undesirable levels of energy which excite resonant modes of vibration of the flexure 32 and load beam 20 are absorbed and dissipated as heat by the damping layer of visco-elastic material 48 due to shear energy absorption. The reduction in vibration tends to improve the close contact of the slider 38 and the surface of the disk 28 when the hard disk drive is functioning, which in turn improves the quality of the signal. In the case of floating heads, the reduction in vibration tends to improve the constant floatation gap. In both cases the reliability of reading and writing data is improved. The gimbaling function of the gimbal suspension 10 is not significantly effected by the vibration damping visco-elastic material 48 because the damping effect tends to be significant primarily when there is an undesirable relative velocity, or movement with respect to time, between the protrusion 26 and the flexure 32.

The vibration dampening gimbal suspension 10 of the invention may be used with other known vibration dampening means, but is intended to replace many current popular vibration dampening systems including but not limited to various kinds of constrain layer dampers formed on the load beam.

To those skilled in the art, many changes and modifications will be readily apparent from consideration of the foregoing description of a preferred embodiment without departure from the spirit of the present invention; the scope thereof being more particularly pointed out by the following claims. The description herein and the disclosures hereof are by way of illustration only and should not be construed as limiting the scope of the present invention which is more particularly pointed out by the following claims.

What is claimed is:

1. A head gimbal assembly comprising:
   a protrusion extending from a surface of a support structure,
   a support plate with a first surface and an opposite second surface, the first surface of the support plate tending to exert pressure against the protrusion, and
   a layer of visco-elastic vibration dampening material adhered on the first surface of the support plate between the protrusion and the support plate, and contacting an apex region of the protrusion in a well formed in the visco-elastic vibration dampening material.

2. The head gimbal assembly of claim 1, wherein the support structure is a load beam.

3. The head gimbal assembly of claim 2, wherein the load beam has a top surface, and a bottom surface, and a distal end with the protrusion extending from the top surface or the bottom surface of the load beam.

4. The head gimbal assembly of claim 3, wherein the protrusion on the top surface or on the bottom surface of the load beam is defined by a corresponding depression on the opposite surface of the load beam.

5. The head gimbal assembly of claim 1, further comprising a flexure supporting the support plate.

6. The head gimbal assembly of claim 5 wherein the flexure comprises a pair of opposed support arms coupled to the support plate.

7. The head gimbal assembly of claim 1 wherein the second surface of the support plate is coupled to a slider.

8. The head gimbal assembly of claim 1, wherein the visco-elastic material is a sheet of material.

9. The head gimbal assembly of claim 8, wherein the sheet of visco-elastic material is a visco-elastic polymer.

10. The head gimbal assembly of claim 1, wherein the vibration dampening material is coupled to the support plate by adhesion.

11. A head gimbal assembly comprising:
    a load beam having a distal end and a bottom surface, with a protrusion formed on the bottom surface,
    a flexure, coupled to the load beam, and having a slider support plate with a top side and a bottom side, the top side of the slider support plate tending to exert pressure against the protrusion on the bottom surface of the load beam, and
    a layer of visco-elastic material adhered on the top surface of the slider support plate between the protrusion on the bottom surface of the load beam and the top side of the support plate, and contacting an apex region of the protrusion at a well formed in the visco-elastic material.

12. The head gimbal assembly of claim 11, further comprising a slider coupled to the bottom surface of the slider support plate.

13. The head gimbal assembly of claim 11, wherein the protrusion on the bottom surface of the load beam is defined by a corresponding depression on the top surface of the load beam.

14. The head gimbal assembly of claim 11 wherein the flexure comprises a pair of opposed support arms coupled to the support plate.

15. The head gimbal assembly of claim 11, wherein the visco-elastic material is a sheet of material.

16. A method for reducing the vibration experienced by a read/write head on a hard disk drive actuation assembly, the method steps comprising:
    (a) providing a load beam having a distal end and a bottom surface, with a protrusion formed on the bottom surface,
    (b) providing a flexure, coupled to the load beam, and having a slider support plate with a top side and a bottom side, the top side of the slider support plate tending to exert pressure against the protrusion on the bottom surface of the load beam, and
    (c) adhering a visco-elastic material on the top surface of the slider support plate between the protrusion on the bottom surface of the load beam and the top side of the support plate, and contacting an apex region of the protrusion at a well formed in the visco-elastic material.

* * * * *

UNITED STATES PATENT AND TRADEMARK OFFICE
CERTIFICATE OF CORRECTION

| | |
|---|---|
| PATENT NO. | : 6,549,376 B1 |
| DATED | : April 15, 2003 |
| INVENTOR(S) | : John E. Scura, Frank Obregon and Lam Tran |

It is certified that error appears in the above-identified patent and that said Letters Patent is hereby corrected as shown below:

Drawings,
Please replace Figures 1, 2 and 3, with the attached Figures 1, 2 and 3.

Signed and Sealed this

Sixth Day of July, 2004

JON W. DUDAS
*Acting Director of the United States Patent and Trademark Office*